UNITED STATES PATENT OFFICE.

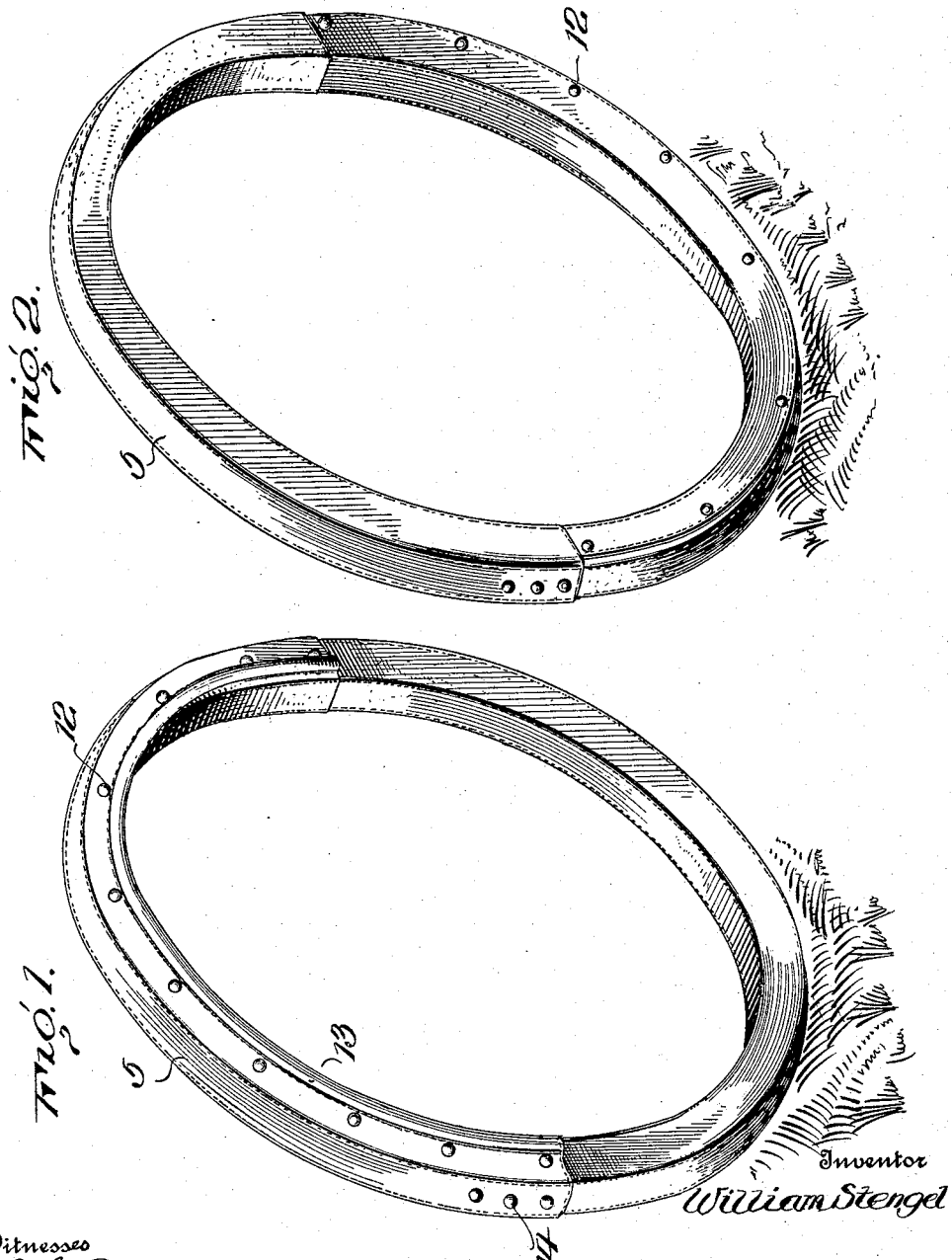

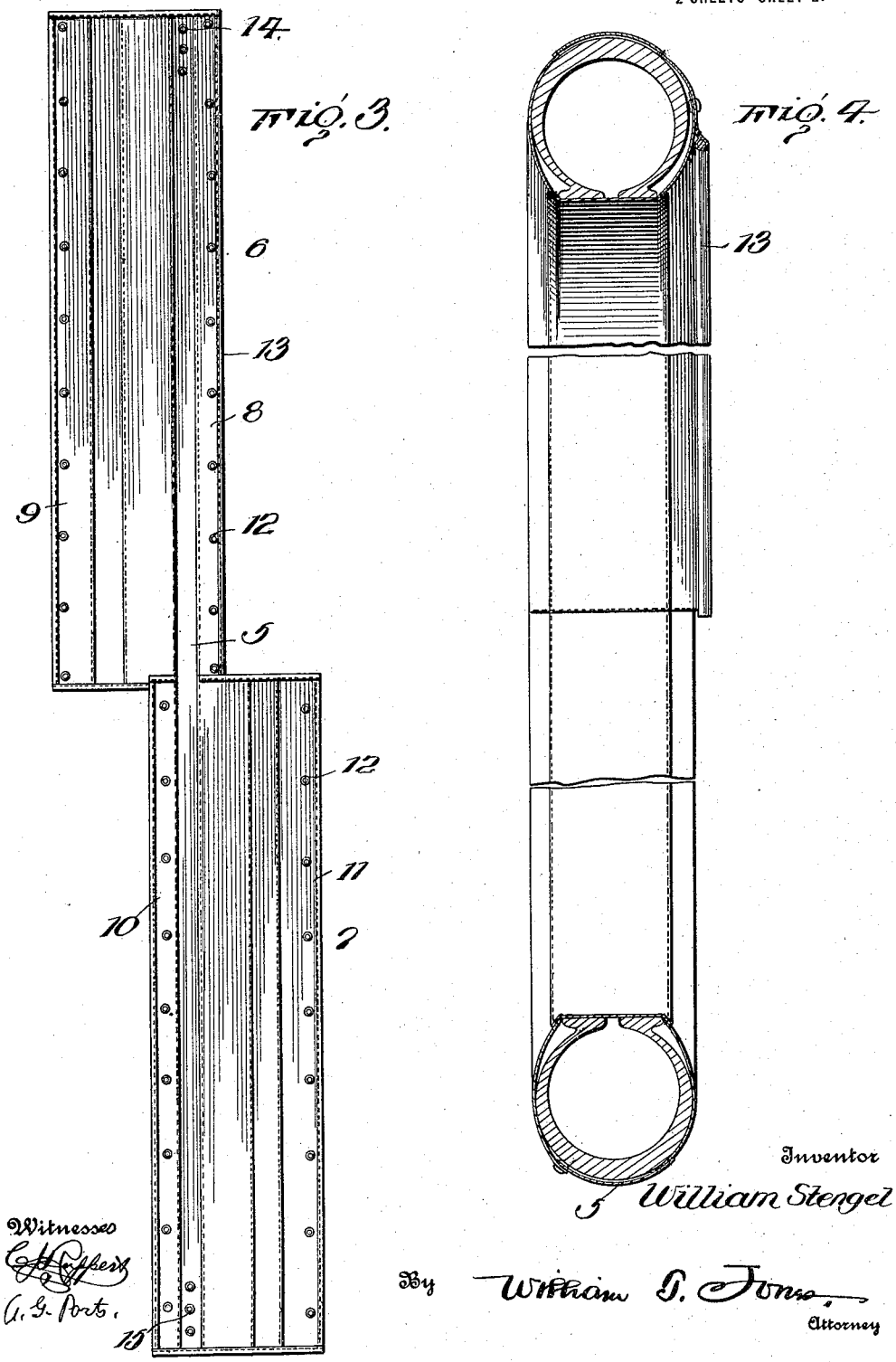

WILLIAM STENGEL, OF NEW YORK, N. Y., ASSIGNOR TO BARNEY STENGEL, OF NEW YORK, N. Y.

TIRE-COVER.

1,201,524. Specification of Letters Patent. Patented Oct. 17, 1916.

Application filed November 22, 1915. Serial No. 62,726.

*To all whom it may concern:*

Be it known that I, WILLIAM STENGEL, a citizen of the United States, residing at New York city, in the county of New York and State of New York, have invented certain new and useful Improvements in Tire-Covers, of which the following is a specification.

My invention relates to improvements in tire covers.

The principal objects of the invention are to provide a tire cover which is absolutely waterproof; to provide a cover which may be easily and quickly applied to and removed from the tire; and to provide a cover which can be manufactured and marketed at nominal expense.

To the accomplishment of the recited objects and others coördinate therewith, the preferred embodiment of my invention resides in the construction and arrangement of parts shown in the accompanying drawings, hereinafter described, and embraced within the scope of the appended claim.

In said drawings: Figures 1 and 2 are perspective views of the obverse and reverse sides of the cover shown applied to a tire. Fig. 3 is a plan view of the cover removed, and Fig. 4 is a transverse section of the tire and cover.

Generally speaking, my invention comprises a medial strip carrying oppositely disposed wings, one of which is designed to envelop the upper half, while the other is adapted to inclose the lower half of a tire. The upper wing is provided with a water-lead having the contour of a semi-circle, and both of the wings have complementary flaps equipped with marginal fastening devices, the flaps opening downwardly with respect to each wing. Means are also provided for securing the wings together.

Referring more particularly to the drawings for a detailed description of the invention, the numeral 5 designates a comparatively narrow medial strip having secured thereto in any suitable manner an upper wing 6 and a lower wing 7. As will be clearly seen upon inspection of Fig. 3, these wings are reversely disposed in the same general plane, and are in all respects substantial duplicates of each other, comprising marginal complemental flaps 8 and 9, and 10 and 11 with head and socket fasteners 12. However, I preferably form a curved bead 13 along the edge of flap 8 of the upper wing, as exhibited in Figs. 1 and 4, for the purpose of leading water from the top of the wing to outlets at diametrically opposite points midway of the diameter of the tire. I also attach fasteners to the terminals of the medial strip, as at 14 and 15, in order that the two wings may be telescopically joined as best seen in Fig. 1.

In the application of my improved cover to a tire, first one, and then the other wing is fastened by means of the devices 12, whereupon the adjacent ends of the wings are brought together in overlapped relation and secured by the fasteners 14 and 15. The cover fits to a nicety and completely envelops the tire, and by virtue of the bead 13 combined with the feature of both sets of flaps opening downwardly, the possibility of water entering between the wings and flaps of the wings is reduced to a minimum. Owing to the extreme simplicity of the cover, users will not encounter the slightest difficulty in its application, as is frequently the case with tire covers now on the market.

It should be understood that in its broader aspects my invention comprehends the employment not only of the means described but of equivalent means for producing the recited functions. It is desired to reserve the right to effect such modifications and variations of my invention as may come fairly within the scope of the appended claim.

What is claimed, is:

In a tire cover, the combination of a pair of wings secured together, fastening means upon opposite longitudinal edges of the wings, the upper wing having a water-lead lying contiguous its fastening means, each of said wings being adapted when closed about a tire in over-lapping relation to form a semi-annular tube, and the fastening means for the lower wing being upon the side of the tire opposite the fastening means and the water-lead of the upper wing, whereby the water is shed from the upper
5 wing free of the lower wing and at points remote from the fastening means of the latter.

In testimony whereof I hereunto affix my signature in the presence of two witnesses.

WILLIAM STENGEL.

Witnesses:
BARNEY STENGEL,
CLARA MESIBOVSKY.

Copies of this patent may be obtained for five cents each, by addressing the "Commissioner of Patents, Washington, D. C."